United States Patent [19]

Mitake

[11] Patent Number: 4,966,544
[45] Date of Patent: Oct. 30, 1990

[54] INJECTION MOLD HAVING COOLING FINS

[75] Inventor: Hiroshi Mitake, Kanagawa, Japan

[73] Assignee: Fuji Photo Film Co., Ltd., Kanagawa, Japan

[21] Appl. No.: 399,393

[22] Filed: Aug. 28, 1989

[30] Foreign Application Priority Data

Jul. 22, 1987 [JP]  Japan ................... 62-183063

[51] Int. Cl.⁵ ........................................... B29C 45/73
[52] U.S. Cl. ..................................... 425/552; 249/79;
          249/111; 264/328.16
[58] Field of Search ............... 249/111, 79, 144, 175;
          264/328.16; 425/546, 547, 552

[56] References Cited

U.S. PATENT DOCUMENTS

| | | | |
|---|---|---|---|
| 2,770,011 | 11/1956 | Kelly | 425/552 |
| 4,208,177 | 6/1980 | Allen | 425/546 |
| 4,622,001 | 11/1986 | Bright et al. | 425/552 |
| 4,764,103 | 8/1988 | Mitake | 425/547 |

Primary Examiner—Jay H. Woo
Assistant Examiner—Timothy W. Heitbrink
Attorney, Agent, or Firm—Sughrue, Mion, Zinn, Macpeak & Seas

[57] ABSTRACT

An injection mold for injection-molding a tubular article having a bottom at one end and opening at the other end having a cavity plate and a core which define a cavity conforming to the shape of the article when closed. A gate opens to the cavity at a portion defining the bottom of the article. The core is provided with a coolant passage for circulating coolant up to a portion near the free end surface of the core for defining the bottom of the article. The inner surface of the core defining the end portion of the coolant passage near the free end surface of the core tapering toward the gate and the coolant passage extends near a portion of the free end surface of the core opposed to the gate, and at least one rib is provided on the inner surface of the core at the tapering portion to project into the coolant passage and to extend in parallel to the direction of coolant flow.

3 Claims, 1 Drawing Sheet

INJECTION MOLD HAVING COOLING FINS

This is a continuation of application Ser. No. 07/222,656, filed 7/21/88 now abandoned.

BACKGROUND OF THE INVENTION

1. Field of the Invention

This invention relates to an injection mold, and more particularly to an injection mold which is for injection-molding a tubular glass-like article having a bottom at one end and opening at the other end and has a gate open to the cavity at a portion defining the bottom of the article.

2. Description of the Prior art

In injection molding of a plastic article, the injection mold is generally cooled by flowing mold-cooling water through the mold in order to quickly solidify molten resin injected into the cavity of the mold, thereby shortening the molding cycle. In the case of a mold for molding a glass-like article having a bottom at one end, a blind hole is formed in the core for defining the inner surface of the molded article, and a cooling channel for cooling the core is formed in the blind hole by providing partitioning, a pipe (bayonet), a threaded pipe or the like in the blind hole. For example, such an injection mold is disclosed in Japanese Unexamined Patent Publication No. 62(1987)-62721.

In the conventional injection mold having such a cooling system, there has been the following problem. That is, since the gate through which injection material is injected into the cavity is generally formed in the cavity plate at a portion defining the bottom of the article, a large injection pressure acts on the end face of the core. Existence of the blind hole weakens the strength of the end portion of the core except the peripheral portion. Accordingly, in order to withstand the injection pressure, the end portion of the core must have a substantial thickness. However, when the thickness of the end portion of the core is large, the distance between the end surface of the core and the heat exchange surface between the cooling water and the core is enlarged, and accordingly, the end surface of the core which is most heated by molten resin injected through the gate cannot be sufficiently cooled in a short time, whereby the molding cycle is elongated. That is, if the mold is opened before the injected resin is sufficiently cooled and solidified at the bottom of the article, injection material can string and/or a sink mark can be produced in the bottom of the article.

SUMMARY OF THE INVENTION

In view of the foregoing observations and description, the primary object of the present invention is to provide an injection mold for molding a glass-like article which enables reduction of the molding cycle time without lowering the quality of the molded article and with a sufficient mold strength being ensured.

In accordance with the present invention, the core is provided with a coolant passage for circulating coolant up to a portion near the free end surface of the core for defining the bottom of the article, the inner surface of the core defining the end portion of the coolant passage near the free end surface of the core tapering toward the gate and the coolant passage extending near a portion of the free end surface of the core opposed to the gate, and at least one rib is provided on the inner surface of the core at the tapering portion to project into the coolant passage and to extend in parallel to the direction of coolant flow.

By forming the coolant passage to taper toward the free end surface of the core, the coolant passage can be extended nearer to the free end surface while ensuring a sufficient mold strength. Further, the rib contributes to reinforcement of the end portion of the core. Accordingly, by forming the rib, the coolant passage can be extended further nearer to the free end surface of the core. Thus by forming the coolant passage to taper toward a portion of the free end surface of the core opposed to the gate and to extend near the portion and by forming the rib on the inner surface of the core at the tapering portion to project into the coolant passage, the portion of the core opposed to the gate which is most heated by molten resin injected through the gate can be sufficiently cooled in a short time, whereby the molding cycle is shortened.

The coolant passage may be formed in various ways. For example, it may be in the form of a pipe, or may be formed by separating a blind hole by a partitioning.

The tapering portion of the inner surface of the core may be of various shapes, e,g, truncated cone, truncated pyramid, semi-sphere, so long as the transverse cross-sectional area is reduced toward the gate or the free end surface of the core. The axis of the tapering portion may be deviated from the central axis of the core depending on the position of the gate relative to the core.

Due to the rib, the heat exchange area between the coolant flowing through the coolant passage and the core is enlarged and the end portion of the core can be quickly cooled. Further, since the rib extends in parallel to the direction of coolant flow, the coolant can flow smoothly without dwelling and accordingly the boundary film heat transfer coefficient cannot be lowered, whereby heat can be effectively exchanged between the core and coolant.

DESCRIPTION OF THE PREFERRED EMBODIMENT

Figure 1:
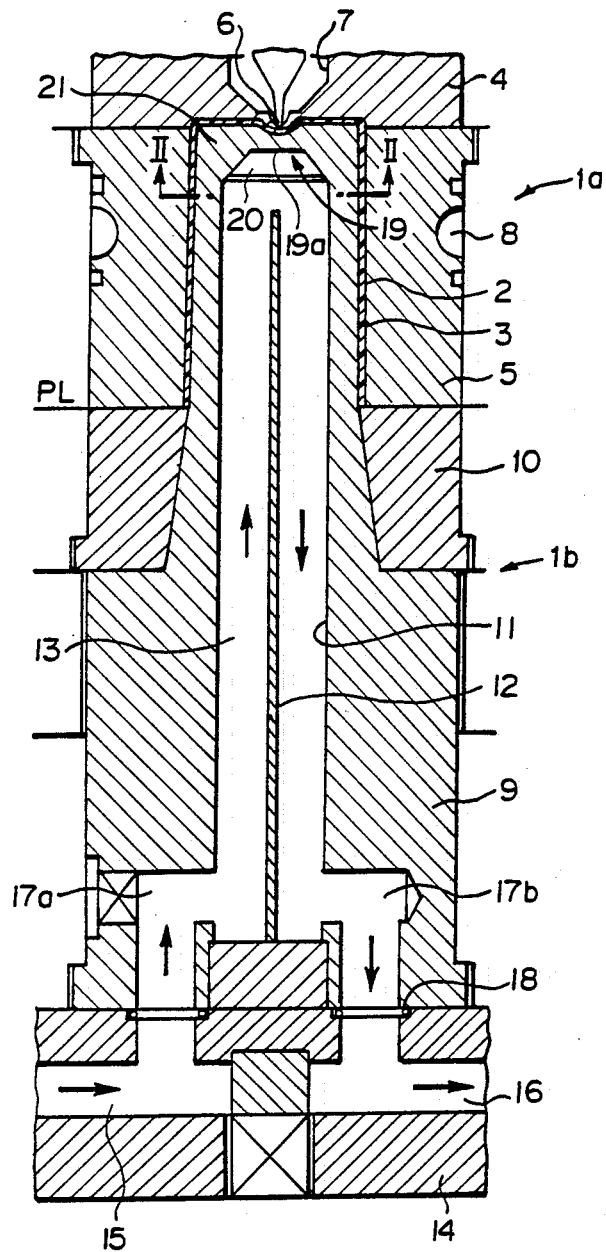
FIG. 1 is a cross-sectional view showing an injection mold in accordance with an embodiment of the present invention.
Figure 2:
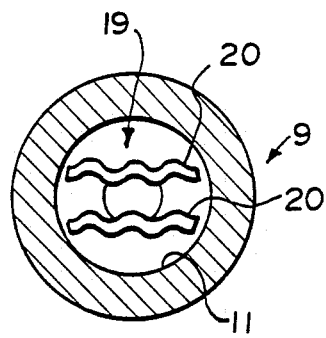
FIG. 2 is a cross-sectional view taken along line II—II in FIG. 1.

In FIGS. 1 and 2, an injection mold in accordance with an embodiment of the present invention comprises a cavity plate 1a forming a stationary mold half and a core 1b forming a movable mold half. In FIG. 1, reference symbol PL denotes the parting line of the mold. When the mold is closed, a cavity 3 conforming to the shape of a glass-like article 2 is defined. The cavity plate 1a comprises a gate bushing 4 defining the shape of the outer surface of the bottom of the article 2, and a cavity bushing 5 defining the shape of the outer peripheral surface of the article 2. The gate bushing 4 is provided with a gate 6 opening in the portion of the cavity 3 corresponding to the bottom of the article 2, and with a hot runner 7 communicated with the gate 6. The cavity bushing 5 is provided with an annular cooling channel 8 for conducting cooling water. The core 1b comprises a core bushing 9 defining the shape of the inner surface of the bottom and the inner peripheral surface of the article 2, and an annular stripper bushing 10 defining the shape of the open end face of the article 2. The stripper bushing 10 is fitted on the core bushing 9 and is moved upward relative to the core bushing 9 to eject the article 2 when the mold is opened.

A blind hole 11 is formed in the core bushing 9 to extend from the base of the core bushing 9 to a portion near the top end face thereof forming the inner surface of the bottom of the article 2. A baffle plate 12 is inserted into the blind hole 11 to extend from the base of the blind hole 11 to a portion spaced from the top of the blind hole 11, thereby separating the space in the blind hole 11 into left and right parts to form a cooling channel 13 in the core bushing 9. The core bushing 9 is fixed to a mounting plate 14, and the left side part of the blind hole 11 is communicated with a water supply passage 15 formed in the mounting plate 14 by way of a communicating hole 17a while the right side part of the blind hole 11 is communicated with a water discharge passage 16 formed in the mounting plate 14 by way of a communicating hole 17b. The junctions between the water supply passage 15 and the communicating hole 17a and between the water discharge passage 16 and the communicating hole 17b are sealed by O-rings 18.

The inner surface of the core bushing 9 defining the bottom of the article, i.e., the top surface 19 of the blind hole 11 is shaped like a truncated cone coaxial with the core bushing 9 with the top 19a of the truncated cone being positioned immediately below the gate 6. Further, on the top surface 19 are formed a pair of ribs 20 to project into the cooling channel 13 and to extend substantially in parallel to the direction of water flow.

As shown i FIG. 2, the ribs 20 are positioned on opposite sides of the longitudinal axis of the core bushing 9 not to be immediately below the gate 6 and extend perpendicular to the partitioning 12. The ribs 20 are corrugated in the same phase. The corrugation of the ribs 20 further enlarges the heat exchange area between the coolant flowing through the coolant passage and the core, and since the corrugations of the ribs 20 are in the same phase, the width of coolant path therebetween is kept uniform and accordingly the corrugation of the ribs 20 does not interfere with flow of coolant therebetween. By providing the ribs 20 at a portion deviated from the portion immediately below the gate 6, the cooling water can reach nearer to the portion immediately below the gate 6, thereby further enhancing the cooling effect. Depending on the injection pressure and the like, the number of the ribs 20 may be increased or decreased. In any case, the rib or ribs should be formed to extend substantially in parallel to the direction of water flow in the cooling channel 13.

By virtue of the rib or ribs, the end portion 21 of the core bushing 9 is substantially reinforced, and accordingly the end portion 21 may be rather small in thickness as shown in FIG. 1. Further, since the top surface 19 of the blind hole 11 is a truncated cone in shape and the top 19a of the cone is positioned immediately below the gate 6, the portion of the end portion 21 immediately below the gate 9 is the smallest in thickness.

The rib 20 may have any cross-sectional shape provided that it does not cause dwelling of cooling water flow. For example, the cross-sectional shape of the rib may be rectangular, trapezoid tapering toward the free end thereof, triangular or semi-circular.

With the mold closed, i.e., with the core 1b pressed against the cavity plate 1a, molten resin is injected into the cavity 3 through the gate 6. Though high injecting pressure acts on the end surface of the core bushing 9 during injection and the end portion 21 of the core bushing 9 is relatively small in thickness, the end portion 21 withstands the high injection pressure by virtue of the rib or ribs.

The molten resin injected into the cavity 3 is hottest at a portion near the gate 6, i.e., at a portion forming the bottom of the article. However, when cooling water flows through the cooling channel 13 over the top of the partitioning 12, the cooling water contacts with the top surface 19 and the surface of the corrugated ribs 20, and accordingly heat exchange occurs over a wide surface area, whereby the end portion of the core bushing 9 can be quickly cooled. Further, since the thickness of the portion of the core bushing 9 opposed to the gate 6 is particularly small, heat can be quickly exchanged between the end surface of the core bushing 9 and the inner surface of the core bushing 9, whereby the molten resin forming the bottom of the article near the gate 6 can be quickly cooled and solidified, and accordingly the molding cycle time can be shortened.

Further, since the rib is provided in the cooling channel 13 at a turning point at which cooling water turns around in parallel to the direction of water flow, dwelling of water flow cannot be caused by the rib and accordingly, the boundary film heat transfer coefficient is not lowered, whereby cooling efficiency of the end portion 21 of the core bushing 9 is further improved.

The molten resin forming the tubular portion of the article 2 is cooled by both the cooling water flowing through the cooling channel 13 of the core bushing 9 and the cooling water flowing through the cooling channel 8 of the cavity bushing 5.

I claim:

1. An injection mold for injection-molding a tubular shaped article from a molten material, said article having a bottom at one end thereof and an opening at another end thereof, said mold comprising a female mold and a male mold which, when closed, define a cavity conforming to the shape of said article, said female mold having a gate opening communicating with the cavity at a portion defining the bottom of the article, said male mold having a blind hole provided therein and a baffle plate disposed in said blind hole so as to axially extend from an opening of the blind hole to a cooling position spaced from an end of the blind hole so as to define a cooling channel within said blind hole around said baffle plate for circulating coolant up to said cooling position, the end of said blind hole having a conical shape and being positioned in opposition to said gate opening of said female mold, wherein at least one rib-like fin is provided on the end of the blind hole to assist in cooling of said molten material in a vicinity of said gate opening, said at least one fin projecting into the cooling position in said cooling channel and extending perpendicular to said baffle plate so as to be parallel to the direction of coolant flow.

2. An injection mold as defined in claim 1 in which said rib is corrugated.

3. An injection mold as defined in claim 1 in which said rib is provided on the male mold at a portion deviated from the cooling position immediately opposed to the gate.

* * * * *